Figure 1:
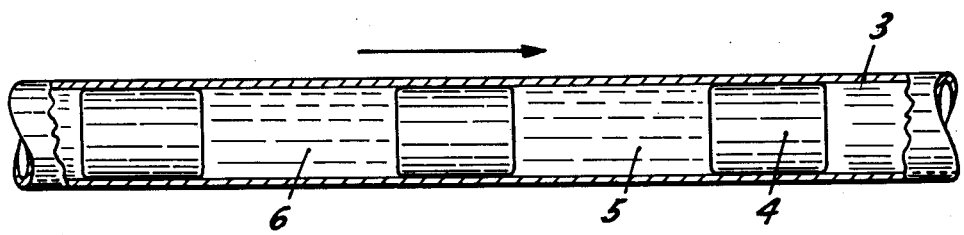

June 16, 1964   R. R. MANERI ETAL   3,137,318
PROCESS FOR SEALING PIPELINES
Filed April 8, 1963

INVENTORS
REMO R. MANERI
WILLIAM W. PEDERSEN
BY Robert F. Fleming Jr.

ATTORNEY 3,137,318
PROCESS FOR SEALING PIPELINES
Remo R. Maneri and William W. Pedersen, Midland, Mich., assignors to Dow Corning Corporation, Midland, Mich., a corporation of Michigan
Filed Apr. 8, 1963, Ser. No. 271,398
8 Claims. (Cl. 138—97)

This invention relates to a process for sealing leaks, joints and the like openings in pipelines.

The process of this invention is particularly useful for sealing leaks and joints in pipelines of the type used to transmit natural gas, petroleum products and water and which have a diameter of 12 inches or smaller.

The process of this invention can be used as a final means for sealing leaks and joints in newly laid pipelines. More significant, however, is the fact that this process can be used to seal leaks and joints in old pipelines without the necessity of digging them up. That is to say, this process is particularly useful as a means for repairing old pipelines in place.

Attempts have been made to seal leaks and joints in pipelines by sending a set of traveling plugs carrying a room temperature vulcanizable rubber, such as an acetoxy endblocked siloxane rubber, between them through the pipeline. This causes the room temperature vulcanizable rubber to be deposited in the leaks and joints where it cures and thus seals the leaks and joints. These attempts have been successful to some extent for sealing minor leaks but have been unsuccessful for sealing major leaks thus leaving the problem still virtually unsolved.

Applicants have now discovered a process for sealing leaks, joints and the like openings in pipelines which comprises passing through a pipeline first a room temperature vulcanizable rubber and then a catalyst which accelerates the rate of cure of the room temperature vulcanizable rubber, there being at least one traveling plug preceding, separating and following the room temperature vulcanizable rubber and the catalyst, said catalyst causing the room temperature vulcanizable rubber to become cured before the last traveling plug has passed.

The room temperature vulcanizable rubbers that are particularly useful in the process of this invention are the acetoxy endblocked siloxanes.

The term "endblocked" is also intended to include materials which contain some of the specified groups along the chain since it is well known by those skilled in the art that while all of the groups can be on the end of the chain often times such is not the case. Illustrative of these materials and their method of preparation are the acyloxy endblocked room temperature vulcanizable rubbers disclosed in U.S. Patent 3,035,016 to Bruner, the disclosure of which is incorporated herein by reference. Of course, the rubber can be modified if so desired by the addition of any of the well known additives for rubber of which reinforcing fillers, pigments and oxidation inhibitors are illustrative. It is reiterated that the room temperature vulcanizable rubbers disclosed in the above patent are merely illustrative of the many known room temperature vulcanizable rubbers that can be used and the instant invention is not limited to the rubbers disclosed therein.

Any liquid catalyst can be used which accelerates the rate of cure of the room temperature vulcanizable rubber so long as it causes the rubber to become cured before the last traveling plug has passed. For example, an aqueous solution of ammonia can be used.

The concentration of the aqueous ammonia is not particularly critical. Relatively dilute or concentrated solutions can be used. An example of a suitable solution is ordinary reagent grade ammonium hydroxide which contains about 28 percent ammonia. It is obvious, of course, that extremely dilute solutions, while useful, are not very practical.

The traveling plugs used to separate and confine the rubber and catalyst as they pass through the pipe are well known to those skilled in the art of transmitting substances through pipelines and any of the well-known types of traveling plugs can be employed in the process of this invention.

Figure 2:
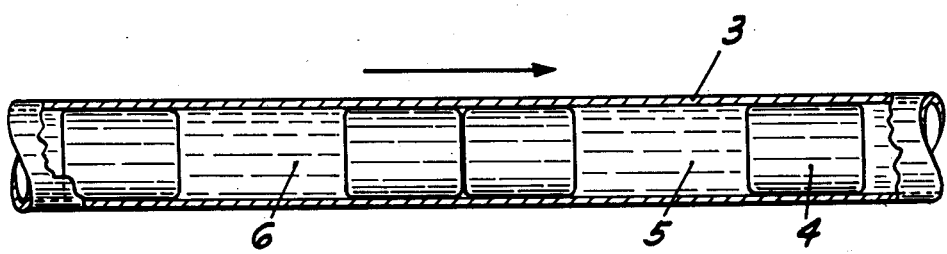

In the drawing, FIGURES 1 and 2 are cut-away drawings showing a segment of pipeline 3, having passing therethru in the direction indicated by the arrow, a room temperature vulcanizable rubber 5 which is a thick liquid and a catalyst 6. Preceding, separating and following the rubber and the catalyst are traveling plugs 4. FIGURE 2 shows two contiguous traveling plugs between the rubber and the catalyst illustrating the fact that more than one traveling plug can precede, separate and/or follow the rubber and the catalyst.

The train, consisting of the plugs, rubber and catalyst, is preferably propelled through the pipeline by applying a gaseous medium against the plug or plugs following the catalyst and at the same time regulating the pressure of air in advance of the plug or plugs preceding the rubber as the train passes through the pipeline. However, it will be obvious to those skilled in the art that many other means can be used for propelling such a train through a pipeline and that the particular means employed will be determined by circumstances. For example, when such a train is to be passed through a short length of pipe it could be pushed through by means of a plunger.

As the aforementioned train passes through the pipe, the rubber fills any leaks, joints or the like openings in the pipe and then when the catalyst comes in contact with the rubber which has filled the leaks and joints, the rubber is caused to rapidly cure and the pipe is effectively sealed.

While it is preferred to use the process of this invention on pipelines which are not in use, the process of this invention can be used "on stream." For example, it is a common practice to transmit different petroleum fractions through the same pipe separating them by means of traveling plugs. A train of the type heretofore described can be incorporated between two such petroleum fractions or in one of them thus sealing leaks, joints and the like openings in the pipeline without any substantial interruption of its use.

The following examples are for the purpose of illustration only and should not be construed as limiting to the invention.

*Example 1*

Three lengths of pipe and three couplings were put together to simulate a section of pipe. The couplings were opened up to simulate bad leaking conditions. When a set of traveling plugs containing an acetoxy endblocked room temperature vulcanizable rubber between them was passed through the pipe, a complete seal was not obtained. The test was repeated passing a set of traveling plugs through the pipe containing the same acetoxy endblocked room temperature vulcanizable rubber as used before and immediately following it with another set of traveling plugs containing an aqueous solution of ammonium hydroxide (reagent grade). An immediate and complete seal was obtained.

*Example 2*

When a formyloxy, hexoyloxy or octanoyloxy endblocked siloxane rubber is substituted for the acetoxy endblocked siloxane of Example 1, similar results are obtained.

*Example 3*

When a 15 percent aqueous ammonia solution is substituted for the reagent grade ammonium hydroxide of Example 1, equivalent results are obtained.

That which is claimed is:

1. A process for sealing leaks, joints and the like openings in pipelines which comprises passing through a pipeline a room temperature vulcanizable rubber and a catalyst which accelerates the rate of cure of the room temperature vulcanizable rubber, said rubber preceding said catalyst through the pipe, there being at least one traveling plug preceding, separating and following said rubber and said catalyst, and said catalyst causing said rubber to become cured before the last traveling plug has passed.

2. The process of claim 1 wherein the speed at which the train, consisting of the plugs, rubber and catalyst, travels through the pipeline is regulated by regulating the pressure of the air in advance of and behind the train.

3. The process of claim 1 wherein the rubber is a silicone rubber.

4. The process of claim 3 wherein the speed at which the train, consisting of the plugs, rubber and catalyst, travels through the pipeline is regulated by regulating the pressure of the air in advance of and behind the train.

5. The process of claim 4 wherein the rubber is an acyloxy endblocked siloxane and the catalyst is an aqueous solution of ammonia.

6. The process of claim 5 wherein the rubber is an acetoxy endblocked siloxane.

7. The process of claim 5 wherein the speed at which the train, consisting of the plugs, rubber and catalyst, travels through the pipeline is regulated by regulating the pressure of the air in advance of and behind the train.

8. The process of claim 5 wherein the speed at which the train, consisting of the plugs, rubber and catalyst, travels through the pipeline is regulated by regulating the pressure of the air in advance of and behind the train.

References Cited in the file of this patent

UNITED STATES PATENTS

| | | |
|---|---|---|
| 1,548,012 | Dunn | July 28, 1925 |
| 2,118,669 | Grebe | May 24, 1938 |
| 2,754,910 | Derrick et al. | July 17, 1956 |
| 2,804,147 | Pistole et al. | Aug. 27, 1957 |
| 2,934,806 | Taylor | May 3, 1960 |
| 2,950,702 | Ferguson et al. | Aug. 30, 1960 |
| 3,035,016 | Bruner | May 15, 1962 |